H. A. WOOD.
VALVE.
APPLICATION FILED FEB. 5, 1917.

1,260,502.

Patented Mar. 26, 1918.

WITNESSES

INVENTOR
HENRY A. WOOD,
BY
ATTORNEYS

UNITED STATES PATENT OFFICE.

HENRY ALFRED WOOD, OF KINGSTON, ONTARIO, CANADA.

VALVE.

1,260,502.	Specification of Letters Patent.	Patented Mar. 26, 1918.

Application filed February 5, 1917. Serial No. 146,668.

*To all whom it may concern:*

Be it known that I, HENRY ALFRED WOOD, a subject of the King of Great Britain, and a resident of Kingston, in the Province of Ontario and Dominion of Canada, have invented an Improvement in Valves, of which the following is a specification.

My invention is an improvement in valves for fire extinguishers and the like, and has for its object to provide a valve of the character specified, which may be used in connection with any container for fluid under pressure, wherein the valve is so arranged that it will prevent any escape of the fluid when in closed position, and which may be easily opened to permit the escape of the fluid.

Figure 1:
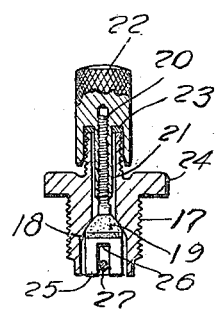
Figure 1 is a longitudinal section of the improved valve.
Figure 2:
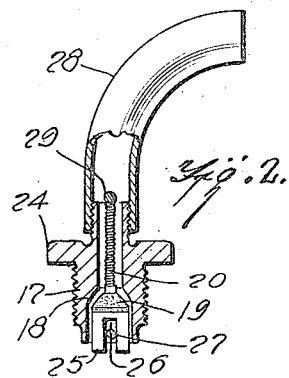
Fig. 2 is a similar view showing the valve open.

In the embodiment of the invention shown in the drawing, the improved valve comprises a casing or body portion 17 corresponding to the casing 3, and the said casing 17 has a tapering seat 18 at its inner end, with which the valve 19 coöperates. This valve has a stem 20 which is threaded, and is adapted to engage a hollow internally threaded stem 21, which extends axially from the cap 22. The outer end of the casing 17 is externally threaded as shown, and a packing 23 is arranged between the said end and the interior of the cap. The valve casing has a flange or rib 24 whose free edge is of polygonal form for engagement by a wrench, and the valve which is of conical form has an extension 25, which is provided with a transverse notch or recess 26. This notch or recess is engaged by a cross pin 27 connected with the casing, the said cross pin preventing the valve from rotating, when it is being turned on to its seat. The externally threaded outer end of the casing 17 may be engaged by the curved tube 28 shown in Fig. 6, the cap 22 being removed to permit the engagement of the tube. The tube has a cross pin 29 which is so placed that when the tube is turned down upon the casing the pin will engage the stem 20 of the valve and will unseat the same. When the improved valve is used in connection with a container, the internal pressure will hold the valve to its seat, and it may be opened by pressing downward on the stem. The cross pin 27 provides a means also for preventing entire disengagement of the valve.

I claim:

A valve for receptacles containing fluid under pressure, and comprising a casing externally threaded for engagement with the receptacle and having the inner end of its bore flaring and having a reduced externally threaded portion at its outer end, a conical valve fitting the seat and having a stem extending through the casing and threaded, a cap fitting over the reduced threaded portion and having a hollow axial stem provided with an internally threaded opening with which the stem has threaded engagement, and means in connection with the casing and the valve for preventing rotation and for permitting longitudinal movement of the valve with respect to the casing.

HENRY ALFRED WOOD.

Copies of this patent may be obtained for five cents each, by addressing the "Commissioner of Patents, Washington, D. C."